United States Patent [19]

Ichikawa et al.

[11] Patent Number: 5,198,663
[45] Date of Patent: Mar. 30, 1993

[54] ANGULAR VELOCITY SENSOR WITH DISPLACEMENT SCALE AND SENSOR MEANS

[75] Inventors: Souji Ichikawa, Sagamihara; Mikio Suzuki, Kawasaki; Wataru Ishibashi, Kawasaki; Shingo Kuroki, Kawasaki; Toshiro Horikawa, Fuchu, all of Japan

[73] Assignee: Mitutoyo Corporation, Tokyo, Japan

[21] Appl. No.: 854,008

[22] Filed: Mar. 19, 1992

[30] Foreign Application Priority Data

Apr. 3, 1991 [JP] Japan .................................. 3-099550
May 13, 1991 [JP] Japan .................................. 3-138316
May 13, 1991 [JP] Japan .................................. 3-138317

[51] Int. Cl.$^5$ .............................................. G01D 5/34
[52] U.S. Cl. ............................ 250/231.1; 73/517 AV
[58] Field of Search ................... 250/231.1, 237 G; 73/505, 499, 496, 504, 516 R, 517 R, 517 AV, 517 B, 861.37, 861.38

[56] References Cited

U.S. PATENT DOCUMENTS

| | | | |
|---|---|---|---|
| 5,001,940 | 3/1991 | Ogawa | 73/517 AV |
| 5,014,554 | 5/1991 | Terada et al. | |
| 5,026,164 | 6/1991 | Ichikawa | |
| 5,057,686 | 10/1991 | Hikawa et al. | |
| 5,067,816 | 11/1991 | Ichikawa | |
| 5,134,283 | 7/1992 | Shiozawa | 250/231.1 |

*Primary Examiner*—David C. Nelms
*Attorney, Agent, or Firm*—Oliff & Berridge

[57] ABSTRACT

In one type of an angular velocity sensor, a constant vibration is applied in an X direction to one end of a vibrator which is fixed at another end and the vibrator vibrates in a Y direction perpendicular to the X direction by an action of Coriolis force caused by the angular velocity of the vibrator about the Z axis with an amplitude proportional to an angular velocity about a Z axis. An angular velocity sensor of this invention utilizes a photoelectric encoder for measurement of the vibration amplitude of the vibrator in the Y direction. The encoder includes a main scale mounted on the free end of the vibrator; an index scale mounted on a housing of the sensor to face the main scale; and a photoelectric element for sensing light reflected from the main scale and passing through the index scale. The angular velocity sensor utilizing the photoelectric encoder is less subject to influence of variation in the temperature in comparison with the conventional sensor utilizing piezoelectric elements and a higher precision can be attained.

17 Claims, 13 Drawing Sheets

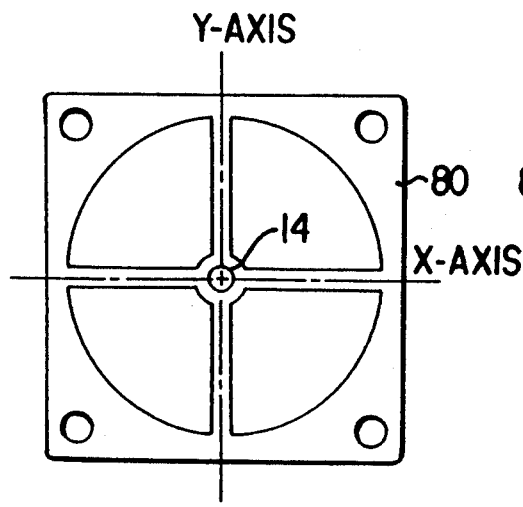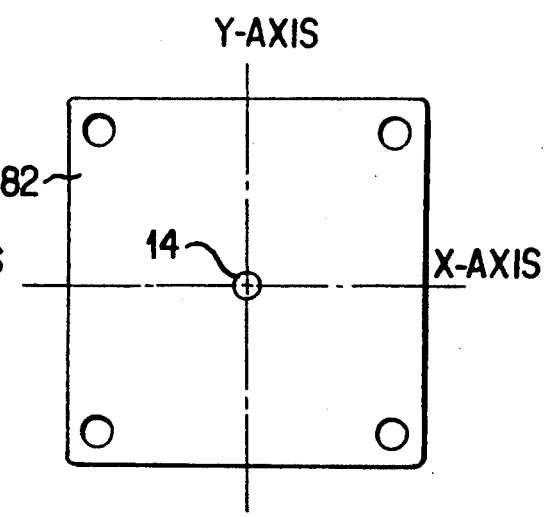
FIG.17A　　　　FIG.17B
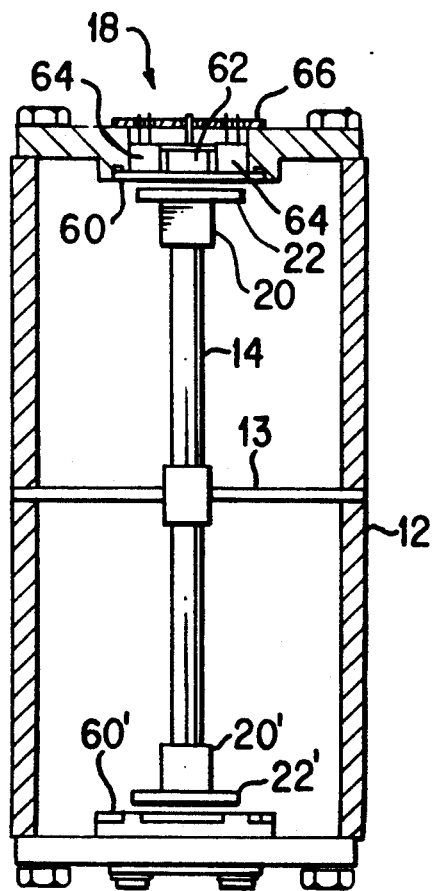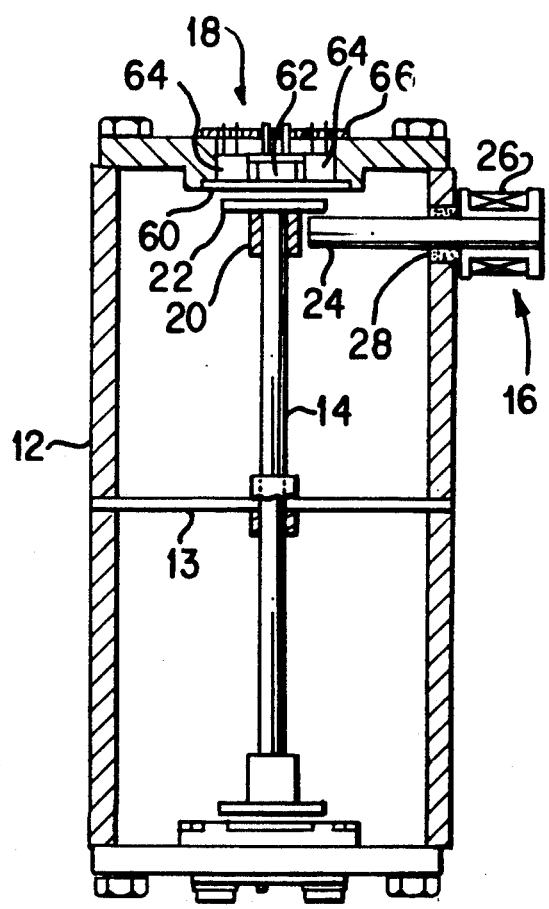
FIG.18A　　　　FIG.18B

ANGULAR VELOCITY SENSOR WITH DISPLACEMENT SCALE AND SENSOR MEANS

BACKGROUND OF THE INVENTION

1. Field of the Invention

This invention relates to an angular velocity sensor (or an angular rate sensor), and more particularly to a vibrating gyro type angular velocity sensor suitable for controlling the movement of arms of a robot or suitably used in a navigation system mounted on a car or the like.

2. Description of the Related Art

Most of the conventional angular velocity sensors are incorporated into navigation systems and used in a relatively narrow field of ships, aircraft and the like. With a navigation system, the current position can be determined by integrating outputs of an angular velocity sensor and an acceleration sensor to derive an azimuth and a traveling distance. Since the output error of the angular velocity sensor is accumulated, the error, however small it may be, accumulates to significant proportions; therefore, it has long been required that an angular velocity sensor be developed to have high precision. In recent years, in order to widely supply the angular velocity sensor in the field of a navigation system mounted on a car, a control device for controlling the movement of arms of a robot, and the like, there has been a strong requirement that the angular velocity sensor be lightweight, compact, cheap and easy to handle in addition to high precision.

Gyros have been used in the angular velocity sensor, and various other types of gyro like sensors have been developed based on various principles, but vibrating gyros and forked gyros have received much attention because of their high sensitivity. The vibrating gyros is disclosed in U.S. Pat. No. 5,014,554, for example.

The vibrating gyro utilizes a phenomenon that a Coriolis force acts on a vibrating body in a direction perpendicular to the vibrating direction when a rotation angular velocity is given to the vibrating body. As the vibrating object, a piezoelectric vibrator having driving piezoelectric elements bonded together (bimorph structure) and attached thereto is generally used. The piezoelectric vibrator vibrates in a preset direction when a cyclic voltage is applied to the piezoelectric elements. The displacement of the vibrator in a direction perpendicular to the vibrating direction is detected by a sensing piezoelectric element and output as an angular velocity signal. The angular velocity sensor using the above vibrating gyro has various advantages, but at the same time, it is difficult to form a highly precise angular velocity sensor at a low cost because of variations in the temperature and hysteresis characteristics of the driving and sensing piezoelectric elements, and the state in which they are attached to the vibrator.

SUMMARY OF THE INVENTION

An object of this invention is mainly to provide an angular velocity sensor capable of stably sensing the angular velocity with high sensing precision.

Another object of this invention is to provide an angular velocity sensor which is simple in construction, compact and low in cost.

In order to achieve the above objects, an angular velocity sensor of this invention comprises a rod-like shaft having a specified portion thereof supported on a housing; excitation means for vibrating the shaft in an X direction with a lengthwise axis of the shaft set in a Z direction of an XYZ rectangular coordinate system; displacement sensing means for producing an output by sensing a displacement of the shaft in a Y direction; and operation means for deriving an angular velocity of the shaft based on the output from the displacement sensing means; wherein the displacement sensing means includes a main scale fixed on the shaft, an index scale fixed on the housing and confronting the main scale, a light emitting element for emitting light to illuminate the main scale, and a plurality of photoelectric light sensors for detecting light which is reflected from the main scale and passed through the index scale before or after being reflected from the main scale.

With the above construction, the shaft is forcedly vibrated in the X direction at a constant frequency by means of the excitation means. In this state, if the shaft is moved within the sensor at a sensor angular velocity $\omega$, a Coriolis force $F_c$ corresponding to the sensor angular velocity $\omega$ is generated in the Y direction to cause the shaft to also vibrate in the Y direction. Then, a signal corresponding to the angular velocity $\omega$ can be derived and output by detecting the displacement of the shaft in the Y direction by use of the displacement sensing means. Further, in the angular velocity sensor of this invention, since an optical means is used in the displacement sensing means, the angular velocity sensor is less influenced by variation in the temperature in comparison with a case wherein the piezoelectric elements are used and the displacement can be detected with high precision.

The present invention, its objects and advantages will become more apparent in the detailed description of a preferred embodiment presented below.

BRIEF DESCRIPTION OF THE DRAWINGS

FIGS. 17A-17B are schematic views showing examples of vibrators which can be used in the device of FIGS. 15A-15B;

FIGS. 18A-18B are schematic construction views showing a device according to still another embodiment of this invention;

DETAILED DESCRIPTION OF THE PREFERRED EMBODIMENTS

Figure 1A:
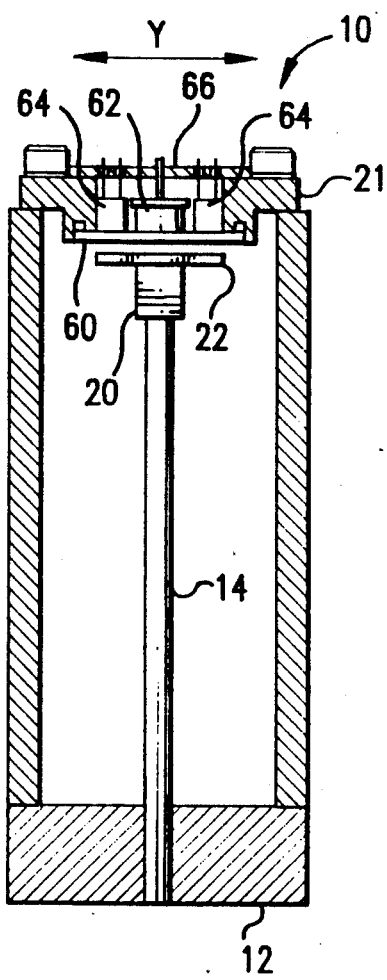
FIGS. 1A and 1B are schematic construction views showing a device according to one embodiment of this invention.
Figure 1B:
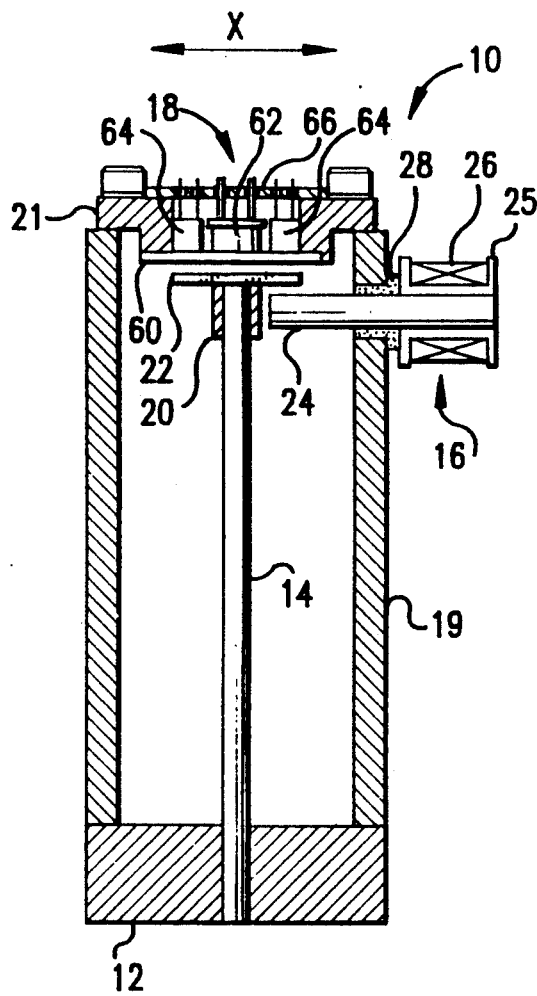

FIG. 1A is a side sectional view of the main portion of an angular velocity sensor according to this invention and FIG. 1B is a front sectional view of the sensor. An angular velocity sensor 10 shown in FIGS. 1A and 1B comprises a rectangular pipe-like housing 19, a base cover 12 for the housing 19, a shaft 14 disposed on and perpendicularly to the base cover 12 and serving as a vibrator, and excitation means 16 for vibrating the shaft 14. On the central portion of an upper cover 21 of the housing 19, a fixed scale portion 18 constituting part of displacement sensing means having the function of a photoelectric encoder is mounted. The round bar-like shaft 14 is formed such that the resonant frequencies thereof in the X and Y directions will be substantially the same. A hollow cylindrical body 20 formed of ferromagnetic material is mounted on the shaft 14 with the free end portion of the shaft inserted into the cylindrical body 20 and a movable scale portion 22 constituting part of the displacement sensing means is mounted on the upper end face of the shaft 14. The excitation means 16 includes a column-like core 24 and an excitation coil 26 wound around a bobbin 25 mounted on the core and is mounted on the housing 19 with a bushing 28 disposed therebetween. One end of the core 24 is set near the circumference surface of the cylindrical body 20.

Figure 2:
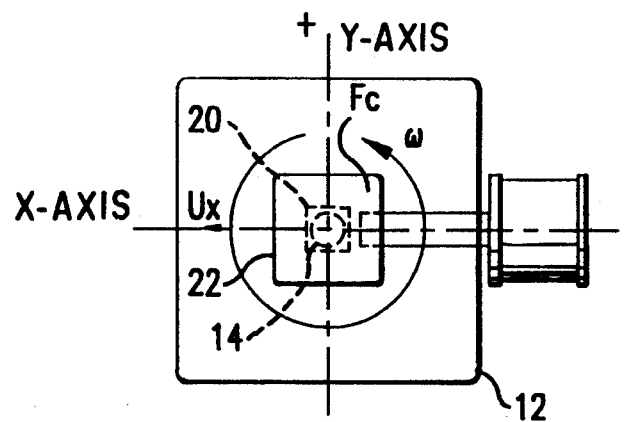
FIGS. 2 and 3A-3E are diagrams for illustrating the principle of angular velocity measurement in the device of FIGS. 1A-1B.

FIG. 2 is a plan view of the main portion of the device of FIGS. 1A-1B and indicates that the lengthwise axis of the shaft 14 is set on the Z axis of the XYZ rectangular coordinate system and the axis of the core 24 intersecting with the shaft 14 at right angles is set on the X axis.

Figure 3A:
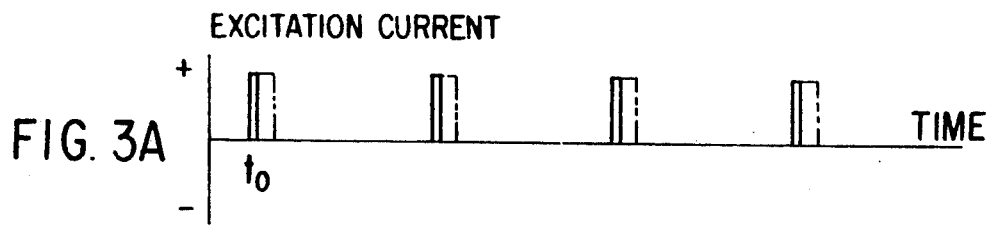
Figure 3B:
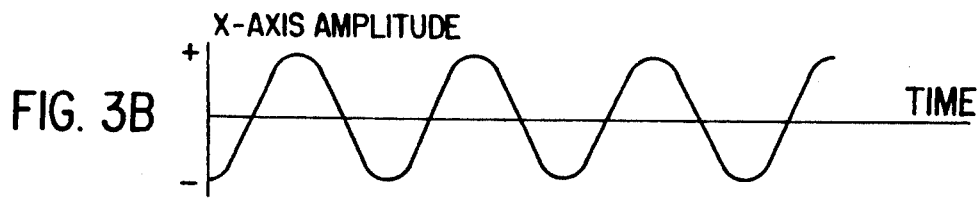
Figure 3C:
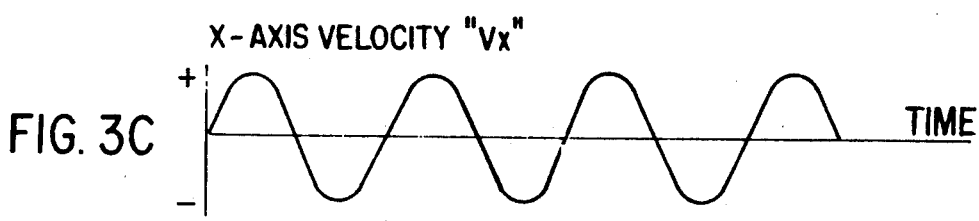
Figure 3D:
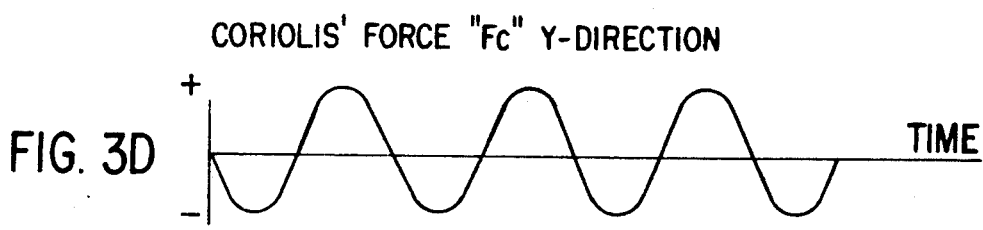

FIGS. 3A-3E are schematic diagrams for illustrating the principle of the angular velocity detection effected by the device shown in FIGS. 1A-1B and 2. As shown in FIG. 3A, when a pulse current of constant pulse repetition frequency is supplied to energize the excitation coil 26, the upper end portion of the shaft 14 is forcedly vibrated in the X direction as shown in FIG. 3B. Therefore, the lengthwise axis, of the shaft 14 angularly vibrates about the Y axis and gives the shaft 14 an angular velocity due to a rotation about the Y axis. The vibration is preferably effected at a frequency equal to the resonant frequency f of the shaft 14. For this purpose, the pulse repetition period is changed and adjusted with the pulse width and pulse height of the energization pulse applied to the excitation coil 26 kept at constant values such that the vibration amplitude (therefore, the peak vibration velocity $V_x$ shown in FIG. 3C) of the free end portion of the shaft 14 will be maximized. If, in this state, an angular velocity due to a sensor rotation about the Z axis is applied to the shaft 14, the Coriolis force $F_c$ which varies in proportion to the thus applied angular velocity is generated so as to vibrate the free end portion of the shaft 14 in the Y-axis direction as shown in FIG. 3D. If the resonant frequencies f of the vibrator (i.e. shaft) 14 in the X-axis and Y-axis directions are equal to each other, the shaft 14 will efficiently vibrate also in the Y-axis direction.

Figure 3E:
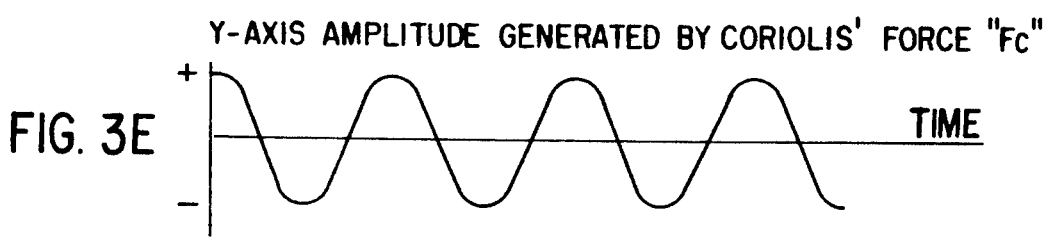

Next, the angular velocity of the shaft is set to a previously known angular velocity $\omega_a$ and the pulse width (or pulse height in some other cases) is finely adjusted with the pulse period of the energization pulse kept at a constant value while monitoring the wave of the vibration amplitude of the shaft 14 in the Y-axis direction so as to set the maximum value of the vibration amplitude (therefore, the peak vibration velocity shown in FIG. 3C) of the free end portion of the shaft 14 in the Y-axis direction shown in FIG. 3E within a predetermined range.

Figure 4:
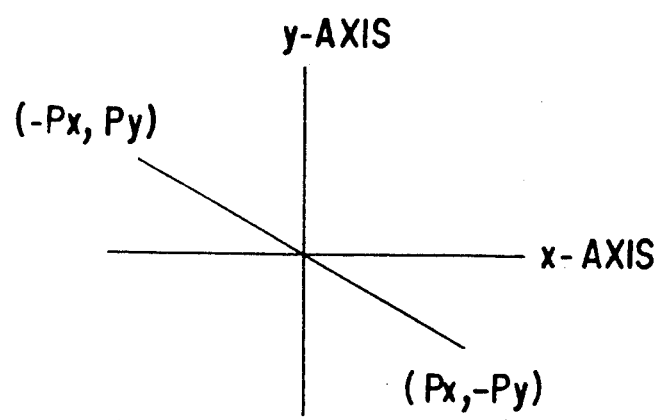
FIGS. 4 and 5 are diagrams for illustrating the vibration control in the device of FIGS. 1A-1B.

FIG. 4 is a diagram showing the locus of the free end portion of the shaft 14 in the XY plane obtained when an angular velocity $\omega$ is given to the shaft 14. The angular velocity $\omega$ varies in proportion to the maximum velocity $V_y$ in the Y-axis direction or the velocity in the Y-axis direction when the vibration amplitude is at "0". Further, the maximum velocity $V_y$ is also proportional to the maximum velocity $V_x$ in the X-axis direction. Therefore, the angular velocity $\omega$ will be proportional only to $V_y$ when $V_x$ is controlled to a constant value. The distance x of the free end of the shaft 14 from the origin of the coordinate and the velocity $V_x$ can be respectively expressed as follows if the maximum vibration amplitude is $P_x$, the frequency is f and time is t.

$X = P_x \sin 2\pi f \cdot t$ $V_x = dX/dt = 2\pi f \cdot P_x \cos 2\pi f \cdot t$ As is clearly understood from the above equations, the maximum velocity $V_x$ is set to $V_x 2\pi f \cdot P_x$ when $\cos 2\pi f \cdot t = 1$ or $-1$. Since the frequency f is constant, it is only necessary to control the vibration amplitude $P_x$ to a constant value.

In the angular velocity sensor of FIGS. 1A-1B, it is not necessary to measure the displacement of the free end portion of the shaft 14 in the X direction and to adjust the energization pulse when the shaft 14 is worked at a high precision and a difference between the actual value of the resonant frequency of the shaft and the theoretical value thereof can be set within a preset range irrespective of the temperature variation. However, in order to achieve the high precision, control means for measuring the displacement of the free end portion of the shaft 14 in the X direction and maintaining the vibration amplitude in the X direction constant is required.

Figure 5:
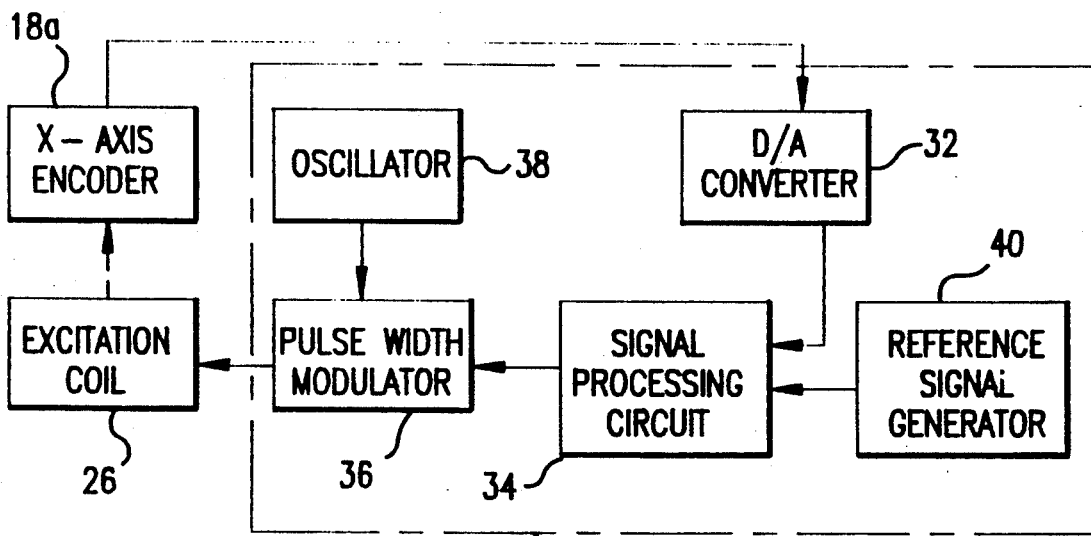

FIG. 5 is a schematic diagram showing the construction of vibration controlling means 30 having the function of keeping the vibration amplitude $P_x$ at a constant value. The vibration controlling means 30 includes a D/A converter 32, signal processing circuit 34, pulse width modulator 36 and oscillator 38. The vibration amplitude of the free end portion of the shaft 14 in the X direction detected by an X-axis encoder 18a constituting the displacement sensing means is converted into an analog signal by the D/A converter 32 to form a measurement value, and the measurement value is compared with a target amplitude value output from a reference signal generator 40 in the operation circuit 34 to form a comparison result. The comparison result is input to the pulse width modulator 36 to control the pulse width of an energization pulse supplied to the excitation coil 26 so as to increase the pulse width when the actual measurement value is small compared to the target value and reduce the pulse width when the actual measurement value is large compared to the target value. The oscillation frequency of the pulse width modulator 36 is controlled by the oscillator 38 and maintained at a constant frequency (resonant frequency). Thus, a feedback loop for making the target amplitude value and the actual measurement value coincident with each other is formed.

Figure 6:
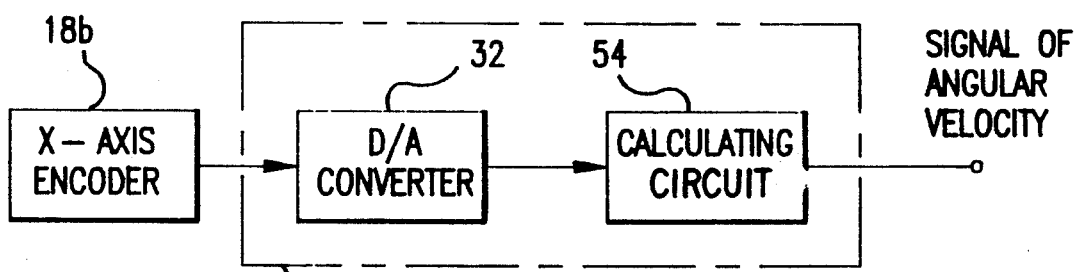
FIG. 6 is a schematic diagram showing an angular velocity calculating means used in the device of FIGS. 1A-1B.

FIG. 6 is a schematic diagram showing the construction of an angular velocity calculating means 50 for deriving the angular velocity based on the vibration amplitude of the free end portion of the shaft 14 in the Y direction detected by a Y-axis encoder 18b constituting the displacement sensing means. The vibration amplitude of the free end portion of the shaft 14 in the Y direction detected by the Y-axis encoder 18b constituting the displacement sensing means is converted into an analog signal by the D/A converter 32 to form a measurement value, and then multiplied by a fixed multiplier A in a calculating circuit 54 to form an output. Since the angular velocity $\omega$ is proportional to the vibration amplitude in the Y direction, the output of the calculating circuit 54 can be controlled to precisely correspond to the sensor angular velocity about the Z axis by correcting or calibrating the fixed multiplier A using a previously known angular velocity.

Figure 7:
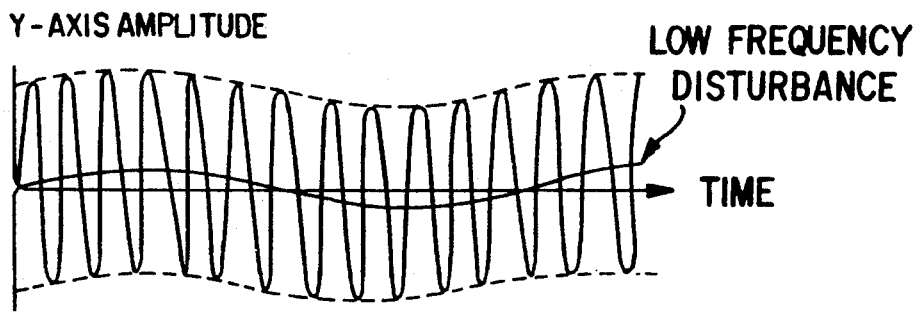
FIG. 7 is a diagram for illustrating the influence of low-frequency disturbance on the device of FIGS. 1A-1B.

Since, in this invention, the sensor angular velocity $\omega$ is measured by detecting the vibration amplitude in the Y-axis direction, influence caused when low-frequency disturbance is introduced can be suppressed to a minimum as shown in FIG. 7.

In another embodiment of said angular velocity calculating means 50 shown in FIG. 6, said calculating circuit 54 receives the signal from X-axis encoder 18a together with the signal from Y-axis encoder 18b so as to calculate the angular velocity $\omega$. By incorporating this type of angular velocity calculating means, it is possible to eliminate the need for the vibration control means 30 from an angular velocity sensor.

Figure 8:
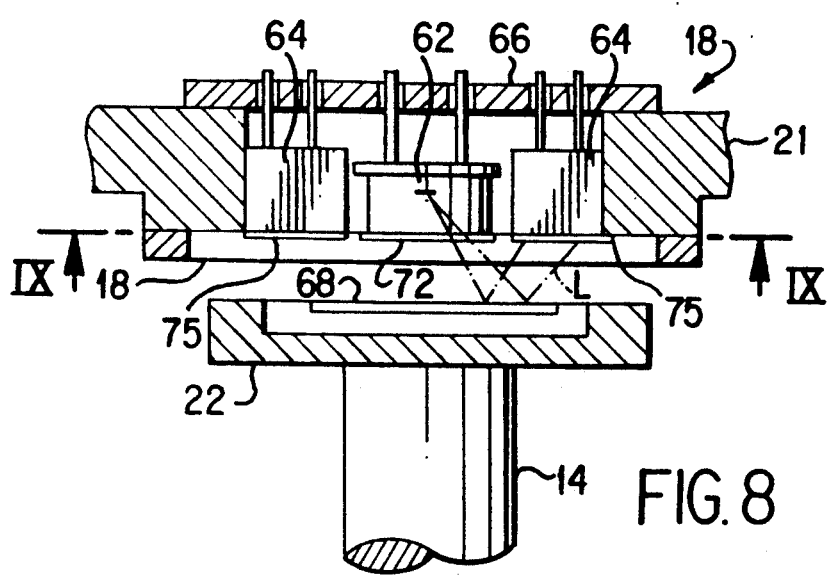
FIGS. 8, 9, 10, 11 and 12 are schematic views for illustrating the construction of displacement sensing means incorporated into the device of FIGS. 1A-1B.
Figure 9:
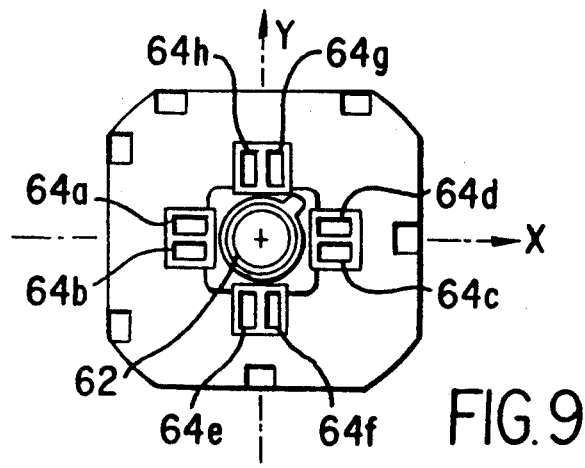

FIG. 8 is a sectional view of one example of a displacement sensor having the function of a photoelectric encoder incorporated into the device of FIGS. 1A-1B and FIG. 9 is a view made when viewing the sensor from a plane taken along the IX—IX line of FIG. 8.

Figure 10:
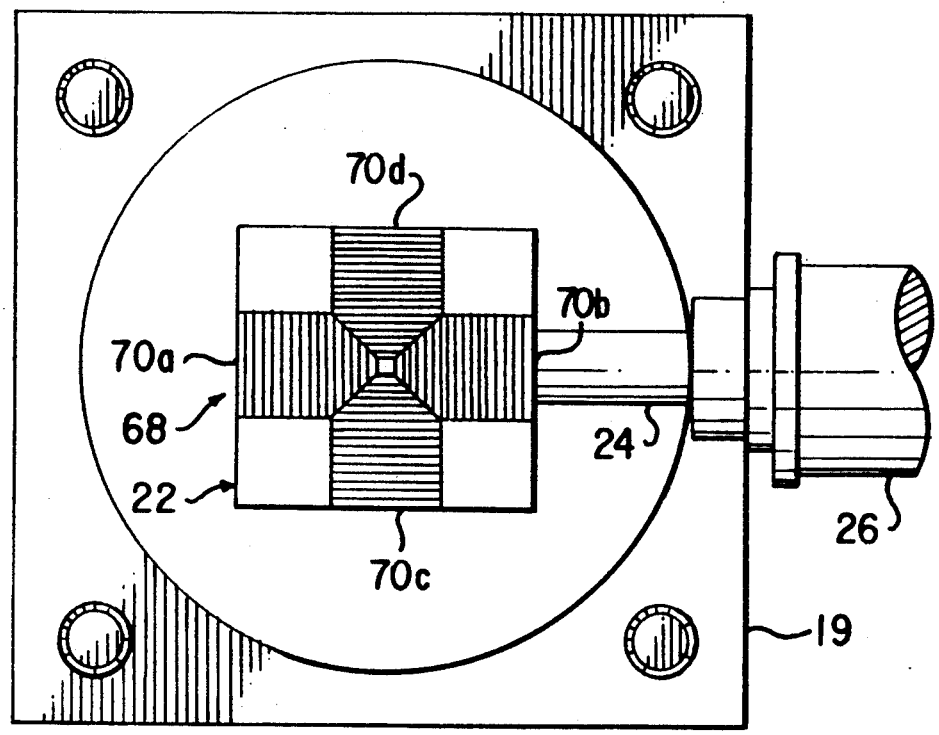
Figure 11:
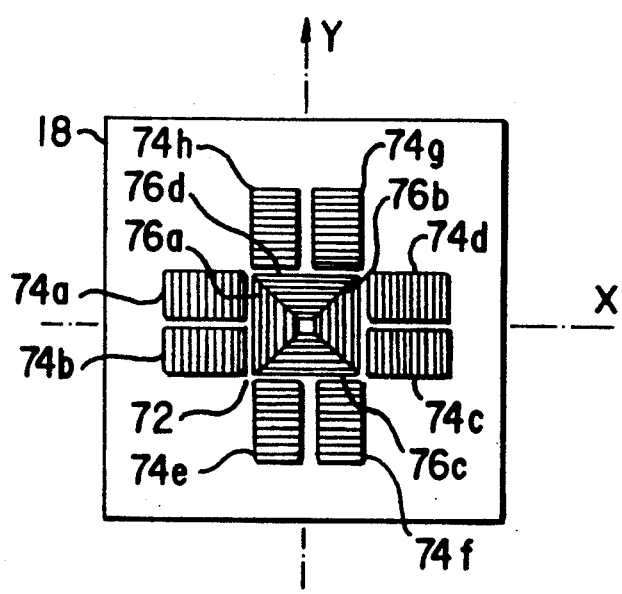

The displacement sensing means includes a movable scale portion 22 mounted on the free end portion of the shaft 14, a fixed scale portion 18 mounted on the upper cover 21, and a signal processing circuit (not shown) and is used to detect the relative traveling distance between the two scale portions. A single light emitting element 62 and eight light receiving elements 64 are disposed on the upper portion of the fixed scale portion 18 and are fixed on a printed circuit board 66 via terminals. In the central position of the fixed scale portion 18, a first index scale 72 having four triangular transmission gratings 76a, 76b, 76c and 76d is disposed as shown in FIG. 11 in which the XY plane thereof is shown and the grating direction of each grating is set in the X or Y direction as shown in FIG. 11. Further, as shown in FIG. 11, a second index scale 75 including eight rectangular transmission gratings 74a, 74b. . . , and 74h is disposed around the first index scale 72 in which the grating direction of each grating is set in the X or Y direction as shown in FIG. 11. The eight light receiving elements 64a, 64b . . . , and 64h are arranged to receive only light passing through the respective eight gratings 74a, 74b . . . , and 74h constituting the second index scale 75. The movable scale portion 22 has a main scale 68 formed in a cross shape as shown in FIG. 10 in which the XY plane thereof is shown. The main scale 68 includes two pentagonal reflecting gratings 70a and 70b whose grating direction is set in parallel with the Y axis and two pentagonal reflecting gratings 70c and 70d whose grating direction is set in parallel with the X axis.

Figure 12:
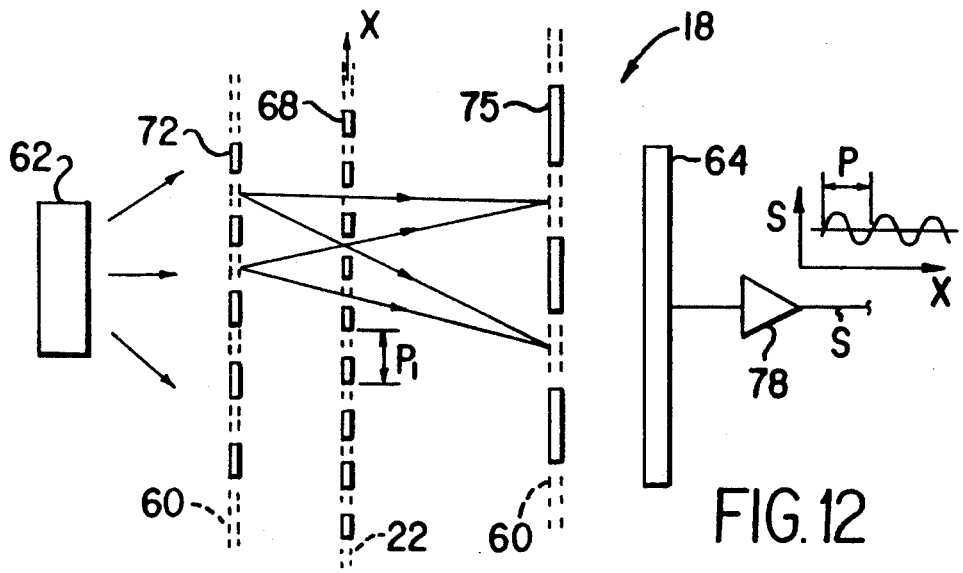

With the above structure, light L emitted from the light emitting element 62 passes through the gratings 76a, 76b, 76c and 76d and is reflected on the main scale 68, and the reflected light from the main scale 68 is received by the light receiving elements 64a, 64b . . . , and 64h via the gratings 74a, 74b . . . , and 74h of the second index scale 75. The gratings 76a and 76b of the first index scale, the gratings 70a and 70b of the main scale, the gratings 74a, 74b, 74c and 74d of the second index scale, and the light receiving elements 64a, 64b, 64c and 64d function as a three-grating type displacement sensor for the relative movement of the fixed scale portion 18 and the movable scale portion 22 in the X direction. Further, the gratings 76c and 76d of the first index scale, the gratings 70c and 70d of the main scale, the gratings 74e, 74f, 74g and 74h of the second index scale, and the light receiving elements 64e, 64f, 64g and 64h function as a three-grating type displacement sensor for the relative movement of the fixed scale portion 18 and the movable scale portion 22 in the Y direction. As shown in FIG. 12, the three-grating type displacement sensor detects the amount of displacement based on the positional relationship between three sheets of gratings and the principle thereof is explained in detail in U.S. Pat. No. 5,026,164 to Ichikawa.

The three-grating type displacement sensor shown in FIG. 12 includes a first index scale 72 and a second index scale 75 which are disposed in parallel, a main scale 68 disposed between and in parallel with the index scales 72 and 75 and arranged to move relative to the index scales, a light emitting element 62 disposed on the left-hand side of the first scale index 72 in the drawing, and a light receiving element 64 disposed on the right-hand side of the second scale index 75 in the drawing. Light emitted from the light emitting element 62 is diffracted in the first index scale 72, main scale 68 and second index scale 75 and is then subjected to the photoelectric conversion by the light receiving element 64. An output of the light receiving element 64 is amplified by a preamplifier 78 and then input as a detection signal S to a processing circuit (not shown).

When the main scale 68 is moved relative to the first and second index scales 72 and 75 in the X direction at a constant speed, the amount of that part of the light emitted from the light emitting element 62 which is interrupted by the scales 72, 68 and 75 gradually varies and the detection signal S varies in substantially the sinusoidal waveform. Since the pitch $P_1$ of the main scale 68 corresponds to the wavelength P of the detection signal S, the relative traveling distance of the main scale 68 can be calculated by detecting the phase of the detection signal S.

A grating has a plurality of grating stripes, and the direction of these grating stripes defines the direction or orientation of the grating. In the device of the above embodiment, the gratings 70a and 70b of the main scale 68 are disposed with a grating orientation in parallel with the Y axis at a pitch of $P_1$ and the gratings 70c and 70d are disposed with a grating orientation in parallel with the X axis at a pitch of $P_1'$. The gratings 76a and 76b of the first index scale 72 are disposed with a grating orientation in parallel with the Y axis at a pitch of $P_2$ and the gratings 76c and 76d are disposed with a grating orientation in parallel with the X axis at a pitch of $P_2'$. The gratings 74a, 74b 74c and 74d of the second index scale are respectively used for the Ax phase, Ax' phase, Bx phase and Bx' phase and disposed with a grating orientation in parallel with the Y axis at a pitch of $P_3$. The gratings 74e, 74f, 74g and 74h of the second index scale 75 are respectively used for the Ay phase, Ay' phase, By phase and By' phase and disposed with a grating orientation in parallel with the X axis at a pitch of $P_3'$.

The gratings are arranged such that the phase differences between the gratings may satisfy the following relation.

When Ax=0°,
Ax'=180°: different from Ax by $\frac{1}{2}P_3$;
Bx=90°: different from Ax by $\frac{1}{4}P_3$; and
Bx'=270° different from Ax by $\frac{3}{4}P_3$.
When Ay=0°,
Ay'=180°: different from Ay by $\frac{1}{2}P_3'$;
By=90°: different from Ay by $\frac{1}{4}P_3'$; and
By'=270°: different from Ay by $\frac{3}{4}P_3'$.

With the above grating arrangement, signals of the Ax phase, Ax' phase, Bx phase and Bx' phase which are deviated from one another by $\pi/2$ can be derived from the light receiving elements 64a, 64b 64c and 64d. The differential-amplified Ax phase output can be derived by calculating the equation of [Ax phase signal amplitude]-[Ax' phase signal amplitude], and the differential amplified Bx phase output can be derived by calculating the equation of [Bx phase signal amplitude]−[Bx' phase signal amplitude]. The deviating direction along the X direction is discriminated by comparing the Ax phase output with the Bx phase output. The displacement between the scales can be detected with high resolution, by sensing the minute variation of the value of the Ax phase output and Bx phase output, or the small deviation of the Ax phase output and Bx phase output.

Further, signals of the Ay phase, Ay'0 phase, By phase and By' phase which are deviated from one another by $\pi/2$ can be derived from the light receiving elements 64e, 64f, 64g and 74h, and the phase discrimination and the relative traveling distance of the scales 22 and 60 in the Y direction can be detected in the same manner as in the case of the X direction.

As described above, according to the displacement sensor of this embodiment, the traveling direction and the traveling distance in the X and Y directions can be detected by use a single sensor. Further, influence caused by variation in the temperature can be made less in comparison with a case wherein a piezoelectric element is used and thus high precision can be attained.

The above embodiment can be modified as follows:

(1) It is preferable to set the pitches of the gratings of the sensors in the X and Y directions different from each other when it is required to set different precisions in the X and Y directions.

(2) Influence of variation in the atmospheric pressure on the vibration of the shaft 14 can be suppressed by forming the housing 19 of hermetically sealed structure.

Figure 13A:
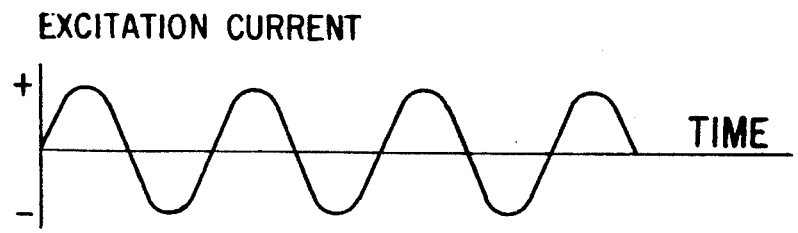
FIGS. 13A-13C are diagrams showing an example of signals supplied to excitation means of the device of FIGS. 1A-1B and illustrating the principle thereof.
Figure 13B:
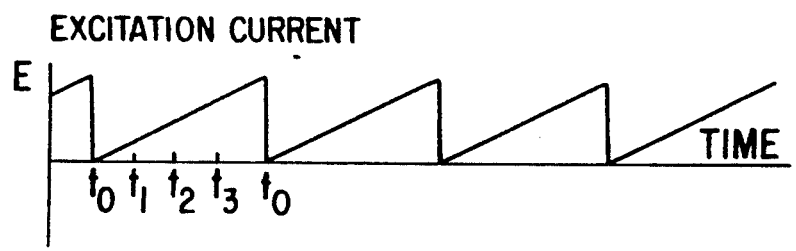
Figure 13C:
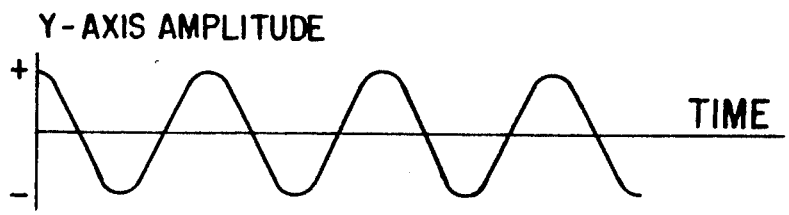

(3) Instead of using a pulse voltage in the device of the above embodiment as a voltage applied to the excitation coil 26, a sinusoidal current shown in FIG. 13A, for example, can be used to energize the same. In this case, a sawtooth wave current shown in FIG. 13B is created in synchronism with the above sinusoidal current, the phases thereof are identified at timings $t_0$, $t_2$, and the amplitude of a detection signal shown FIG. 13C is read at timings $t_1$, $t_3$.

Figures 14A, 14B:
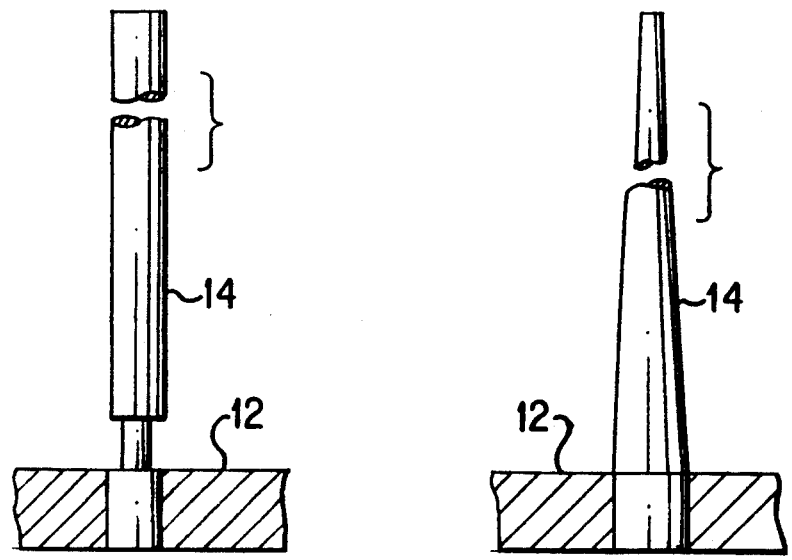
FIGS. 14A-14B are schematic views showing examples of vibrators which can be used in the device of FIGS. 1A-1B.

(4) In the device of the above embodiment, a column-shaped shaft is used as the vibrator, but a shaft having a square, circular or octagonal cross section perpendicular to the Z axis may be used as the shaft, for example. Further, the shaft may be made to have a stepped portion as shown in FIG. 14A or in a tapered form as shown in FIG. 14B. However, it is required that the moment of inertia around the X axis of the vibrator and the moment of inertia around the Y axis of the vibrator must be made substantially equal to each other and the resonant frequency of the vibrator in the X direction and the resonant frequency of the vibrator in the Y direction must be made substantially equal to each other. In order to meet the above requirement, it is preferable to make the cross section of the shaft perpendicular to the Z axis symmetrical with respect to the Z axis in a case where the shaft itself is used as the vibrator.

(5) In the above embodiment, the ferromagnetic hollow cylindrical body is used for that portion of the shaft which faces the core 24, but a magnet may be preferably used, for example.

(6) The linear expansion coefficients of the housing 19 and the vibrator 14 are designed to be substantially equal to each other. As a result of this, occurrence of a measurement error due to variation in the gap between the movable scale 22 and the fixed scale 60 caused by temperature variation can be suppressed.

Figure 15A:
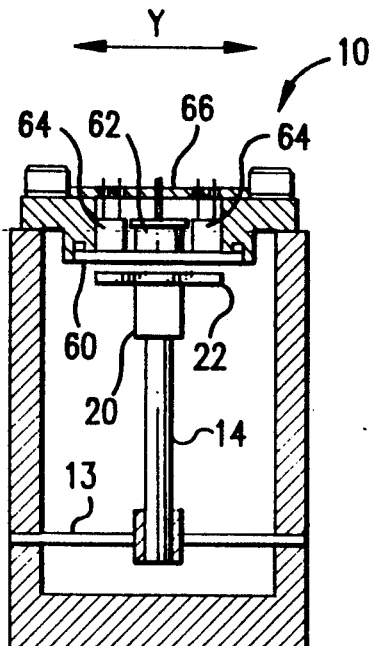
FIGS. 15A-15B are schematic construction views showing a device according to another embodiment of this invention.
Figure 15B:
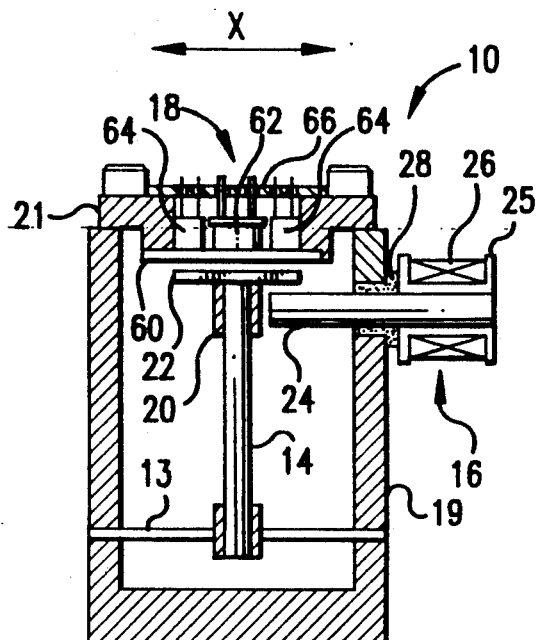

FIG. 15A is a side sectional view of the main portion of a device according to another embodiment of this invention and FIG. 15B is a front sectional view thereof. In FIGS. 15A and 15B, the same reference numerals and symbols as those used in FIGS. 1A and 1B denote the same parts as those used in FIGS. 1A and 1B. The device of FIGS. 15A-15B is significantly different from the device of FIGS. 1A-1B in that vibration of the shaft 14 itself is not used as the vibrator and the elasticity of a flat spring 13 supporting the shaft is used.

Figure 16A:
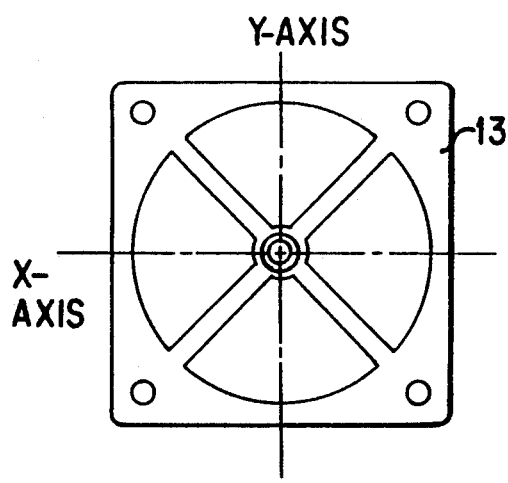
FIGS. 16A-16B are schematic views for illustrating the vibration in the device of FIGS. 15A-15B.
Figure 16B:
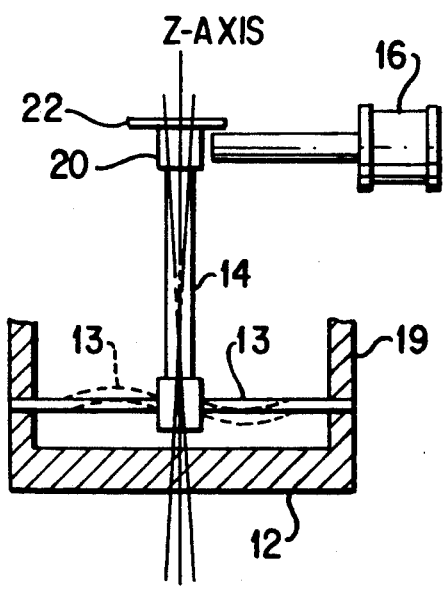

FIG. 16A is a top view of the flat spring 13 and FIG. 16B is a side view of the flat spring 13 in a state when an excitation means 16 is energized. As shown in FIG. 16A, the flat spring 13 is formed by punching out a thin plate to leave an X-shaped belt portion and the peripheral portion thereof is fixed on the inner wall surface of the housing 19. A coupled body of the flat spring 13 and the shaft 14 mounted on the central portion of the flat spring 13, that is, a vibrator must be made to satisfy the condition that the moment of inertia around the X axis of the vibrator and the moment of inertia around the Y axis of the vibrator are set substantially equal to each other and the resonant frequencies f of the vibrator in the X and Y directions are set substantially equal to each other. When the exciting coil 26 of the excitation means 16 is energized in a preset period, the flat spring 13 is bent by means of the shaft 14 as shown by broken lines in FIG. 16B and the flat spring 13 and the shaft 14 vibrate together. As explained in the device of the former embodiment of FIGS. 1A-1B, it is necessary to adjust the energization power source for the exciting coil 26 so as to make the vibration frequency at this time equal to the resonant frequency f of the coupled body.

If the same condition as that for the vibrator is satisfied, a flat spring 80 having a cross-shaped belt portion extending in the X and Y directions as shown in FIG. 17A may be used or a flat spring 82 having no cut-out portion formed therein as shown in FIG. 17B may be used.

FIG. 18A is a side sectional view of the main portion of a device according to still another embodiment of this invention and FIG. 18B is a front sectional view thereof. The device of FIGS. 18A-18B is different from the device of FIGS. 15A-15B in that the peripheral portion of the flat spring 13 is fixed on the center of the inner wall of the housing 19 and the flat spring 13 supports the shaft 14 at substantially the central portion thereof. Further, a hollow cylindrical body 20' and a movable scale portion 22' which have the same constructions as the cylindrical body 20 and the movable scale portion 22 mounted on the upper end of the shaft 14 are mounted on the lower end of the shaft 14 and a fixed scale portion 18' having the same construction as the fixed scale portion 18 mounted on the upper cover 21 is mounted on a base cover 12. With this construction, displacements of opposite ends of the shaft 14 on the XY plane can be simultaneously detected and measured.

Figure 19:
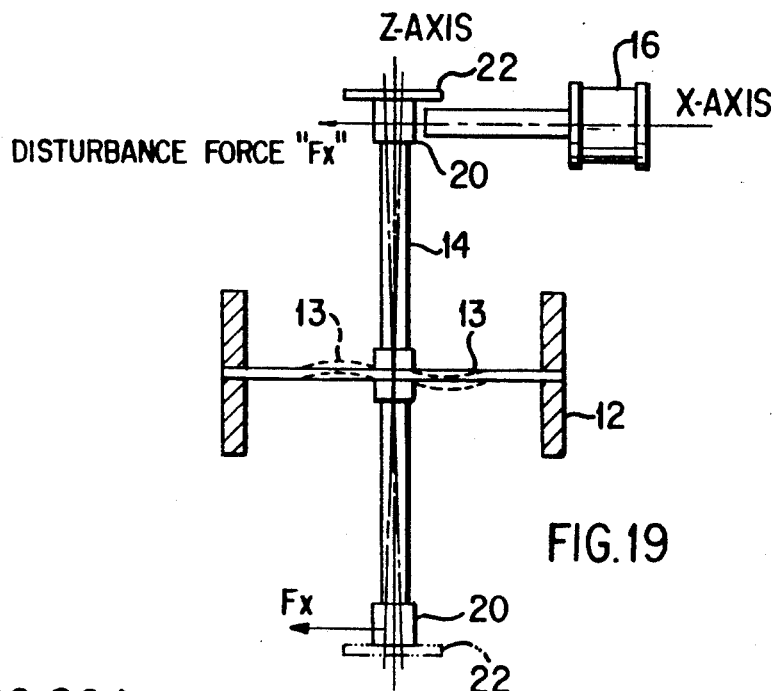
FIG. 19 is a schematic view for illustrating the vibration in the device of FIGS. 18A-18B.

FIG. 19 is a schematic view as viewed from the side for showing the movement of the coupled body of the flat spring 13 and the shaft 14 caused when the excitation means 16 is energized. The flat spring 13 is bent as shown by broken lines in the drawing and the shaft 14 vibrates at the resonant frequency. Respective components of disturbance of the acceleration and centrifugal force equally act on the opposite ends of the shaft 14 as indicated by Fx in the drawing, for example, and therefore, they are canceled with each other and an error of the angular velocity measurement caused by them can be suppressed. Further, since displacement can be detected on the opposite ends of the shaft 14, the displacement can be measured with a large amplitude and with high resolution by combining the signals.

Figure 20A:
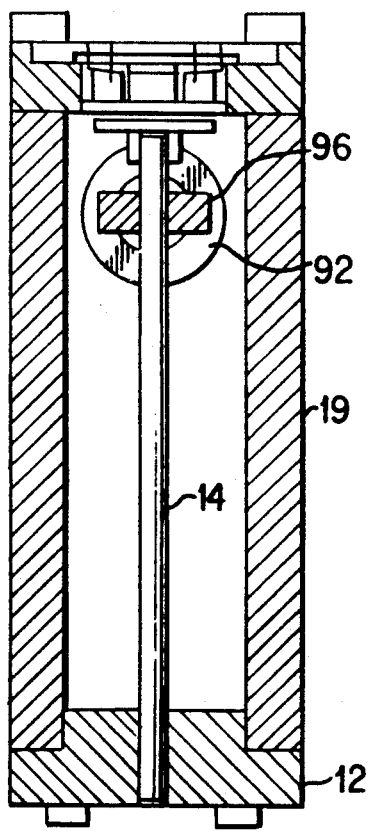
FIGS. 20A-20B are schematic construction views showing a device according to another embodiment of this invention.
Figure 20B:
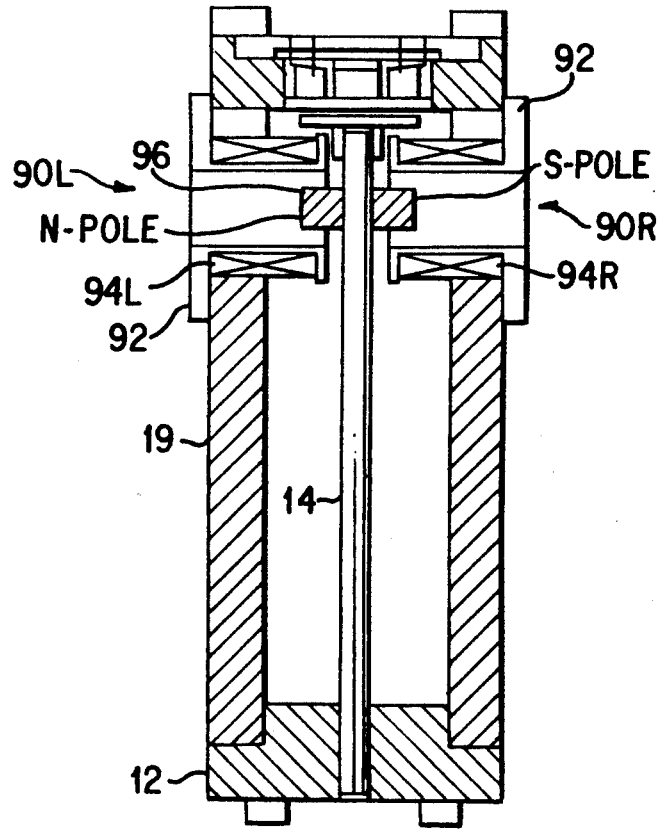
Figure 21:
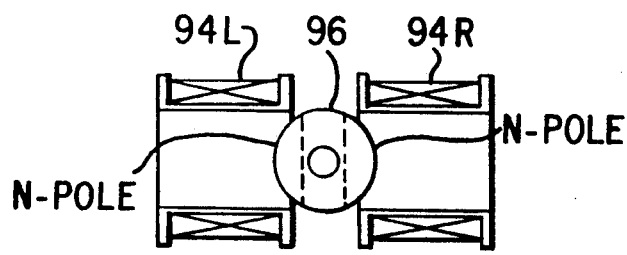
FIGS. 21 and 22A-22C are schematic views for illustrating the vibration in the device of FIGS. 20A-20B.

FIG. 20A is a side sectional view of the main portion of a device according to another embodiment of this invention and FIG. 20B is a front section view thereof. The device of FIGS. 20A-20B is different from the device of FIGS. 1A-1B in that the construction of the excitation means is made symmetrical with respect to the Z axis. An excitation means 90R disposed on the right-hand side of the housing is formed of an air-core coil including a non-magnetic bobbin 92 and an exciting coil 94R and an excitation means 90L disposed on the left-hand side of the housing is formed of an air-core coil including a non-magnetic bobbin 92 and an exciting coil 94L. FIG. 21 is a schematic plan view made when viewing from above a magnet 96 attached to the shaft 14 and the above excitation means. The hollow cylindrical magnet 96 is mounted on the shaft 14 with the central axis thereof aligned with the axis of the shaft and the two side portions of the magnet which lie near the excitation means 90R and 90L are both magnetized to the N pole (or S pole) and the central portion thereof is magnetized to the S pole (or N pole). In this case, the magnet and consequently the shaft 14 can be vibrated in the X-axis direction by causing the magnetic fluxes created in the X-axis direction when the two excitation means are simultaneously energized to be set in the same sense. It is also possible to magnetize the two side portions of the magnet 96 which lie near the excitation means 90R and 90L to the N and S poles, respectively. In this case, the shaft 14 can be vibrated in the X-axis direction by causing the magnetic fluxes created in the X-axis direction when the two excitation means are simultaneously energized to be set in the opposite senses.

Figure 22A:
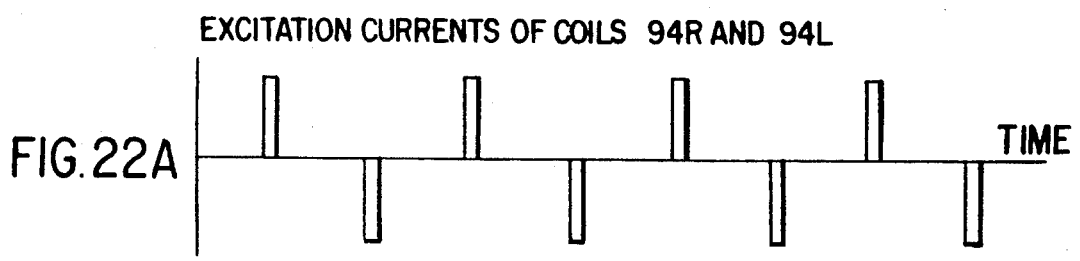
Figure 22B:
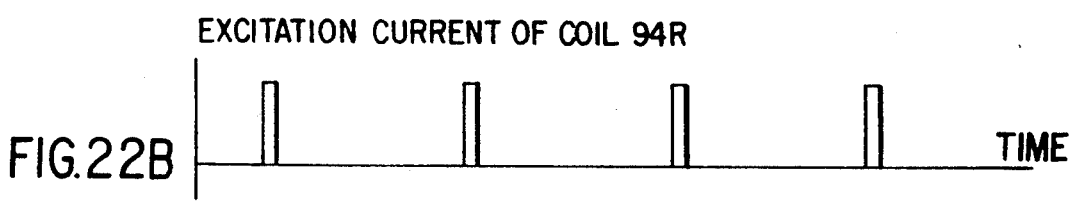
Figure 22C:
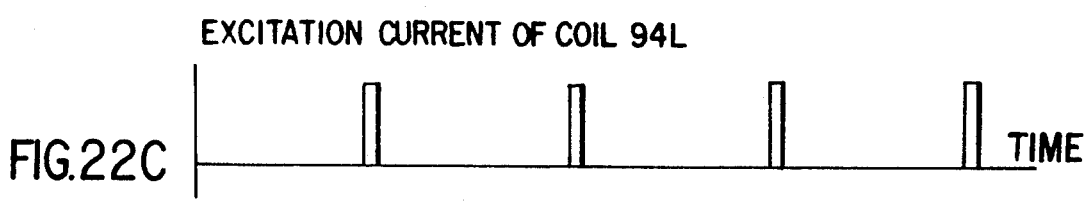

FIG. 22A shows an example of the waveform of an energization pulse applied to the exciting coils 94R and 94L. When the energization is effected twice in a period T corresponding to the resonant frequency f of the shaft 14, it is necessary to alternately change the directions of currents flowing in the exciting coils. FIGS. 22B and 22C show other examples of the waveform of an energization pulse applied to the exciting coils 94R and 94L and the exciting coils 94R and 94L are alternately energized in a period T. The waveform of the exciting pulse can be variously changed according to a difference in the method of connection of the input and output terminals of the exciting coils.

Figure 23A:
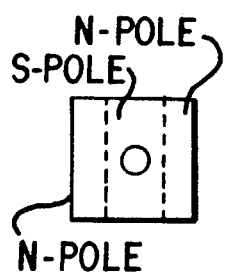
FIGS. 23A-23C are plan views showing an example of a magnet used in the device of FIG. 21.
Figure 23B:
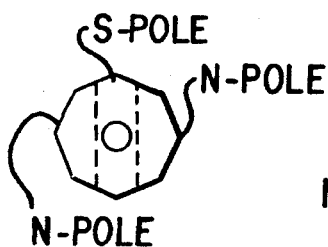
Figure 23C:
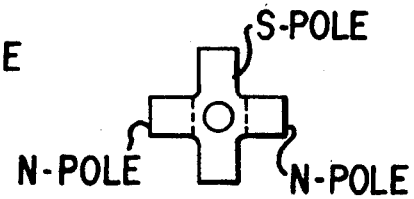

The magnet 96 may be formed to have such shapes as shown in FIGS. 23A-23C if the resonant frequencies of the housing in the X-axis and Y-axis directions are set equal to each other with the magnet 96 mounted on the housing 19.

Figure 24A:
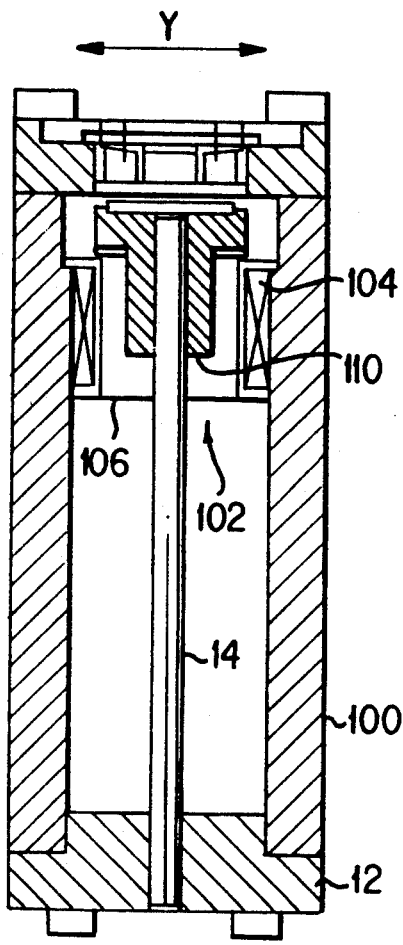
FIGS. 24A-24B are schematic construction views showing a device according to yet another embodiment of this invention.
Figure 24B:
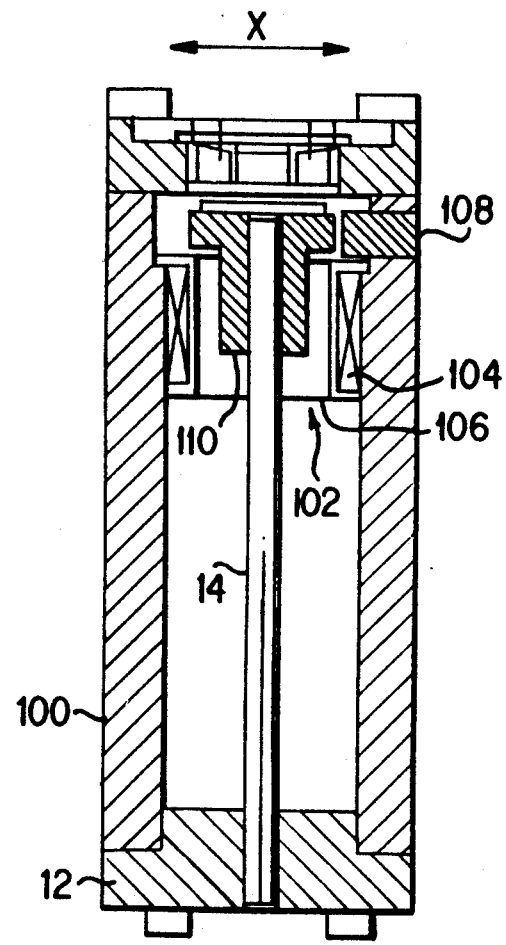
Figure 25:
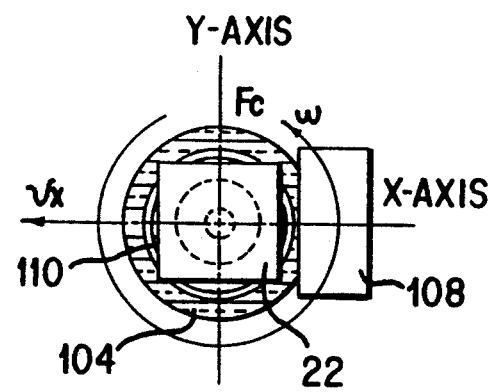
FIG. 25 is a schematic view for illustrating the vibration in the device of FIGS. 24A-24B.

FIG. 24A is a side sectional view of the main portion of a device according to yet another embodiment of this invention and FIG. 24B is a front sectional view thereof. In the device of FIGS. 24A-24B, a housing 100 is formed with a hollow cylindrical form having a circular cross section (the housing 19 in the device of the former embodiment is formed with a pipe-shaped form having a rectangular cross section). An exciting coil 104 and a bobbin 106 for the exciting coil 104 constituting an excitation means 102 are fixed on the inner wall of the housing with the central axes thereof aligned with the central axis of the housing 100. This structure is preferable for miniaturization in comparison with the device of the former embodiment. A magnetic pole piece 108 formed of ferromagnetic material (which is not a magnet) is mounted on part of the housing lying on the X-axis. Likewise, a core 110 formed of ferromagnetic material (which is not a magnet) is mounted on the free end of the shaft 14. FIG. 25 is a plan view showing the main portion near the upper end portion of the shaft 14. In FIG. 25, the core 110 is formed in a circular form with a flange portion, but the flange portion can be formed in an octagonal or square form.

In the device of FIGS. 24A-24B, when the exciting coil 104 is energized, the magnetic flux whose density distribution is symmetrical with respect to the X axis is created if the magnetic pole piece 108 is not provided, but since the magnetic pole piece 108 is actually provided, the magnetic flux density becomes high near the magnetic pole piece 108 and the core 110 of ferromagnetic material is attracted towards the magnetic pole piece 108. As a result, like the other embodiments, the shaft 14 can be vibrated by applying a periodic energization pulse to the exciting coil 104. It is also possible to dispose the excitation means in a position near the lower end portion of the base cover plate 12 instead of the position near the upper end portion of the shaft.

Figure 26A:
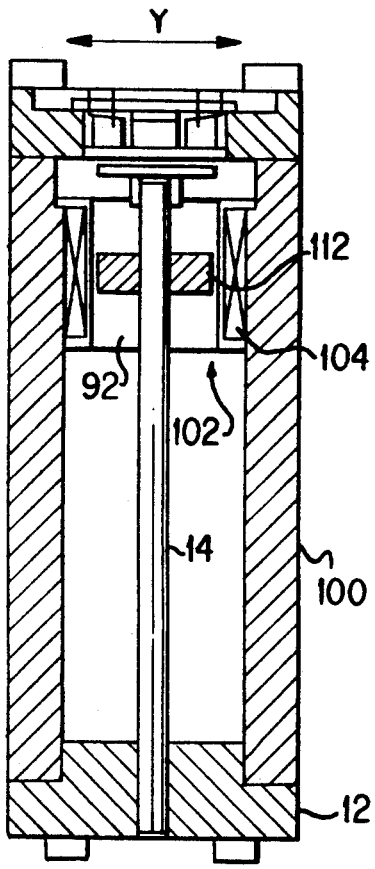
FIGS. 26A-26C are schematic construction views showing a device according to a further embodiment of this invention.
Figure 26B:
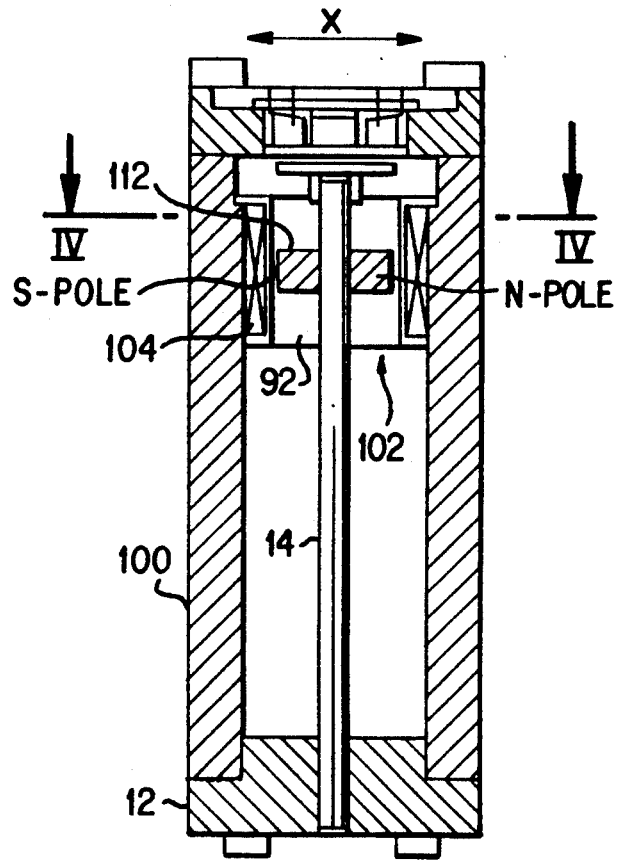
Figure 26C:
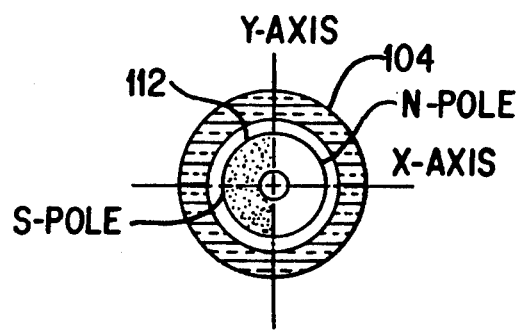

FIG. 26A is a side sectional view of the main portion of a device according to a further embodiment of this invention, FIG. 26B is a front sectional view thereof and FIG. 26C is a sectional view taken along the (VI—VI) line of FIG. 26B. Also, in the device of FIGS. 26A–26C, a housing 100 is formed with a hollow cylindrical form having a circular cross section and an exciting coil 104 and a bobbin 106 for the exciting coil 104 constituting an excitation means 102 are fixed on the inner wall of the housing 100 with the central axes thereof aligned with the central axis of the housing 100. A hollow cylindrical magnet 112 is mounted on the free end portion of the shaft 14 and the position thereof is aligned with the center of the air-core coil. The right-hand and left-hand portions of the magnet 112 with respect to the Y axis are respectively magnetized to the N (S) and S(N) poles as shown in FIG. 26C. The magnet 112 is not necessarily formed with a cylindrical shape so long as it is symmetrical with respect to the Z axis.

Figure 27:
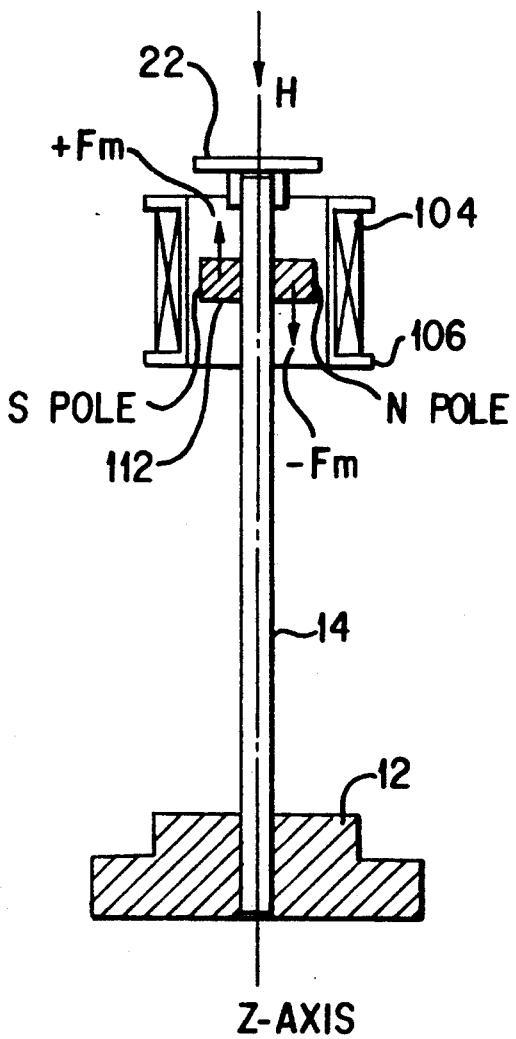
FIG. 27 is a schematic view for illustrating the vibration in the device of FIGS. 26A-26C.

FIG. 27 is a schematic view for illustrating the principle of vibration in the device of FIGS. 26A–26C. When the exciting coil 104 is energized, a magnetic field is created in parallel with the Z axis, and if the intensity and direction of the magnetic field is H as shown in FIG. 27, forces of $-Fm$ and $+Fm$ are applied to the right and left portions of the magnet. Therefore, if the distance of the point of application of the force Fm from the central axis (Z axis) of the shaft 14 is 1, the bending moment M applied to the shaft 14 is expressed as $M=2Fm\cdot 1$. Since the shaft 14 is moved in the right-hand direction by the bending moment, the shaft 14 can be vibrated in the X-axis direction with a resonant frequency as has been described with reference to the device of the former embodiment by adjusting the period and polarity of the energization pulse applied to the exciting coil.

The device of FIG. 27 is simple in construction in comparison with the device of the other embodiments and therefore high precision can be easily attained in the manufacturing and assembling process.

What is claimed is:

1. An angular velocity sensor comprising:
a rod-like shaft having a specified portion thereof supported on a housing;
excitation means for vibrating a free end portion of said shaft in an X direction with a lengthwise axis of said shaft set in a Z direction of an XYZ rectangular coordinate system;
displacement sensing means for producing an output by sensing a displacement of the free end portion of said shaft in a Y direction; and
operation means for deriving an angular velocity about said shaft based on the output from said displacement sensing means;
wherein said displacement sensing means includes a main scale fixed on the free end portion of said shaft, an index scale fixed on said housing and confronting said main scale, a light emitting element for emitting light to illuminate said main scale, and a plurality of light sensors for sensing light which is reflected by said main scale and passed through said index scale.

2. An angular velocity sensor comprising:
a rod-like shaft having a specified portion thereof supported on a housing;
excitation means for vibrating a free end portion of said shaft in an X direction with a lengthwise axis of said shaft set in a Z direction of an XYZ rectangular coordinate system;
displacement sensing means for producing an output by sensing a displacement of the free end portion of said shaft in the X direction and a Y direction; and
operation means for deriving an angular velocity about said shaft based on the output from said displacement sensing means;
wherein said displacement sensing means includes a main scale fixed on the free end portion of said shaft, an index scale fixed on said housing and confronting said main scale, a light emitting element for emitting light to illuminate said main scale, and a plurality of light sensors for sensing light which is reflected by said main scale and passed through said index scale.

3. An angular velocity sensor comprising:
a rod-like shaft having a specified portion thereof supported on a housing;
excitation means for vibrating a free end portion of said shaft in an X direction with a lengthwise axis of said shaft set in a Z direction of an XYZ rectangular coordinate system;
displacement sensing means for producing an output by sensing a displacement of the free end portion of said shaft in the X direction and a Y direction;
control means for controlling said excitation means to keep constant a first signal of the output from said displacement sensing means, the first signal indicating a displacement in the X direction; and
operation means for deriving an angular velocity about said shaft based on a second signal of the output from said displacement sensing means, the second signal indicating a displacement in the Y direction;
wherein said displacement sensing means includes a main scale fixed on the free end portion of said shaft, an index scale disposed to face said main scale, a light emitting element for emitting light to illuminate said main scale, and a plurality of light sensors for sensing light which is reflected by said main scale and passed through said index scale.

4. An angular velocity sensor according to claim 3, wherein said index scale includes a plurality of first index scale gratings, each of said plurality of first index scale gratings being arranged between said light emitting element and said main scale.

5. An angular velocity sensor according to claim 3, wherein the specified portion of said shaft is one end portion of said shaft and said main scale is mounted on the other end portion of said shaft.

6. An angular velocity sensor according to claim 3, wherein the specified portion of said shaft is fixed to said housing with an elastic member disposed therebetween.

7. An angular velocity sensor according to claim 3, wherein the specified portion of said shaft is substantially the central portion of said shaft, the specified portion being fixed to said housing with an elastic member disposed therebetween.

8. An angular velocity sensor according to claim 3, wherein a cross section of said shaft is symmetrical with respect to the Z axis, the cross section being perpendicular to the Z axis.

9. An angular velocity sensor according to claim 3, wherein said excitation means includes a magnetic member mounted on said shaft; magnetic field generation means mounted on said housing near said magnetic member for providing a magnetic field; and a current source for driving said magnetic field generation means.

10. An angular velocity sensor according to claim 3, wherein said excitation means includes a column-shaped magnet mounted on said shaft with the central axis of said magnet aligned with the lengthwise axis of said shaft and with opposite end portions of said magnet in the X-axis direction magnetized to have like magnetic poles; two air-core coils fixed on said housing near corresponding ones of the opposite end portions of said magnet in the X-axis direction; and an exciting power source for said air-core coils.

11. An angular velocity sensor according to claim 3, wherein said excitation means includes a magnet mounted on said shaft with a central axis of said magnet aligned with the lengthwise axis of said shaft and with opposite end portions of said magnet in the X-axis direction magnetized to have different magnetic poles; an air-core coil mounted on an inner wall surface of said housing to surround said magnet; and an exciting power source for said air-core coil.

12. An angular velocity sensor according to claim 3, wherein said main scale and index scale each include a plurality of grating groups, representative gratings from different grating groups having grating directions that intersect at right angles.

13. An angular velocity sensor according to claim 3, wherein said index scale includes a plurality of second index scale gratings, each of said plurality of second index scale gratings being arranged between said main scale and said plurality of light sensors.

14. An angular velocity sensor according to claim 9, wherein said magnetic member is a ferromagnetic member.

15. An angular velocity sensor according to claim 9, wherein said magnetic member is a magnet.

16. An angular velocity sensor according to claim 11, wherein the magnet is a column-shaped magnet.

17. An angular velocity sensor according to claim 11, wherein the magnet is a polygonal pole-shaped magnet.

* * * * *